United States Patent [19]

Harrington

[11] Patent Number: 4,527,659

[45] Date of Patent: Jul. 9, 1985

[54] THERMALLY-RESPONSIVE MUFFLER DRAINHOLE VALVE MECHANISM

[75] Inventor: Daniel L. Harrington, Skokie, Ill.

[73] Assignee: J. I. Case Company, Racine, Wis.

[21] Appl. No.: 579,263

[22] Filed: Feb. 13, 1984

[51] Int. Cl.³ .............................................. F01N 7/16
[52] U.S. Cl. .................................... 181/244; 181/239
[58] Field of Search .............. 181/235, 237, 244, 254, 181/233, 241, 239

[56] References Cited

U.S. PATENT DOCUMENTS

| | | | |
|---|---|---|---|
| 2,818,131 | 12/1957 | Doughty | 181/244 |
| 3,783,590 | 1/1974 | Allen | 181/237 X |
| 3,923,122 | 12/1975 | Itria | 181/235 X |

*Primary Examiner*—Benjamin R. Fuller

*Attorney, Agent, or Firm*—Dressler, Goldsmith, Shore, Sutker & Milnamow, Ltd.

[57] ABSTRACT

A muffler assembly having a thermally-responsive valve mechanism is disclosed which facilitates draining of moisture from within the muffler assembly without compromise of its sound-attenuating characteristics. The muffler includes an outer muffler body which defines a water drainhole disposed at a relatively low portion of the muffler where water would otherwise collect. The valve mechanism comprises a valve member affixed to the muffler body in overlapping relation relative to the water drainhole. Notably, the valve member comprises material having a coefficient of linear thermal expansion which differs from that of the material from which the muffler body is formed, thus permitting the valve member to close and open the drainhole attendant to thermal expansion and contraction of the muffler body, respectively.

4 Claims, 7 Drawing Figures

U.S. Patent   Jul. 9, 1985   4,527,659
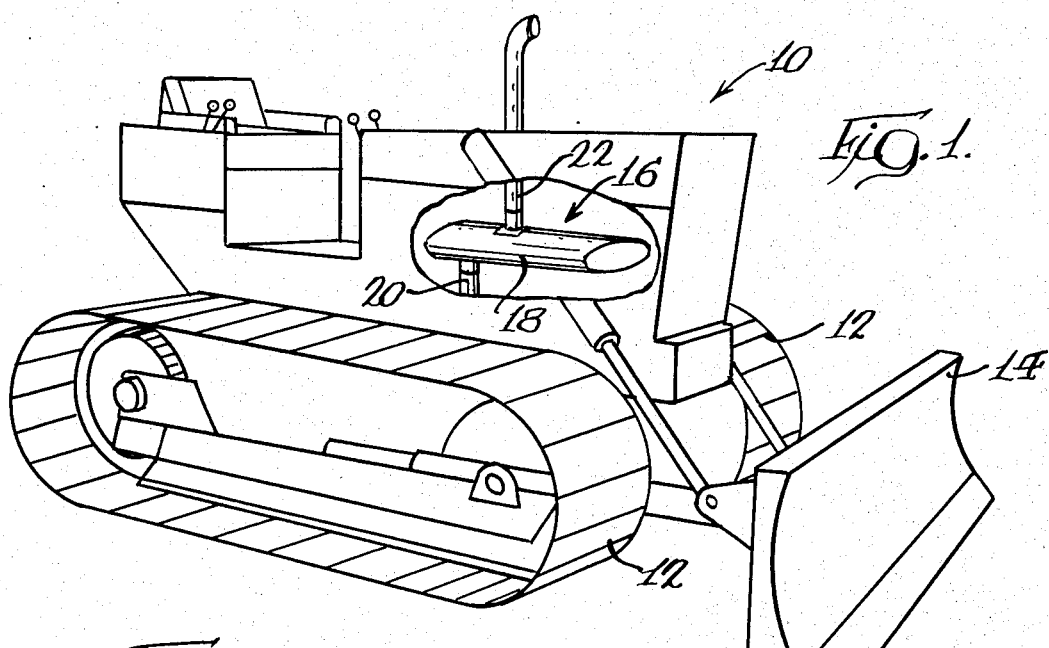
Fig. 1.
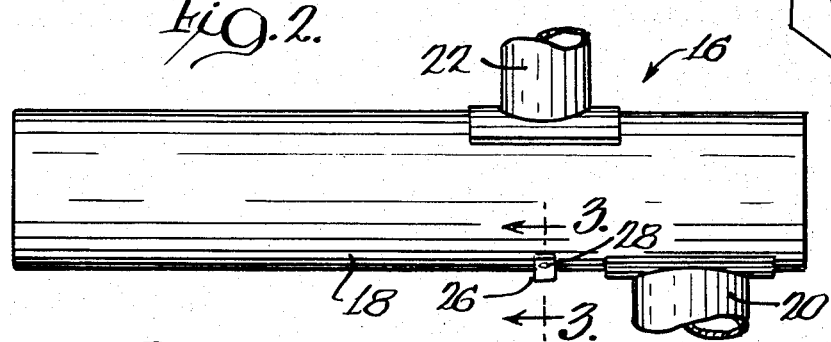
Fig. 2.
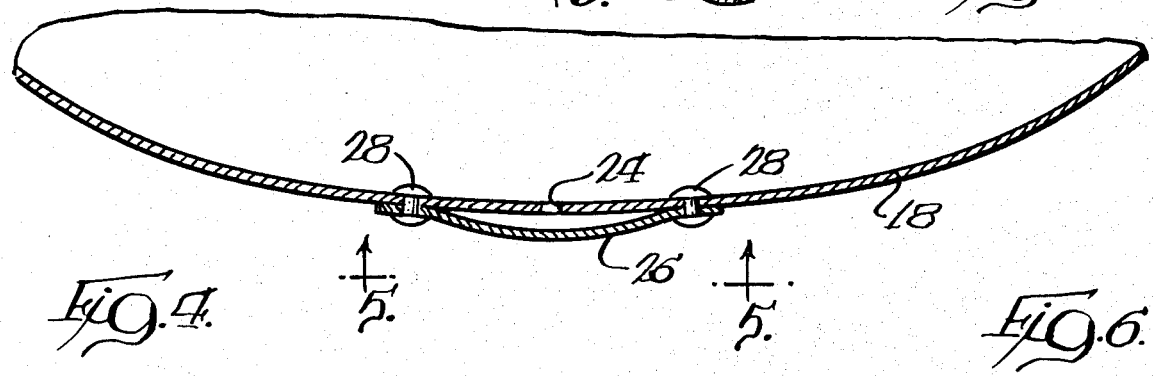
Fig. 3.
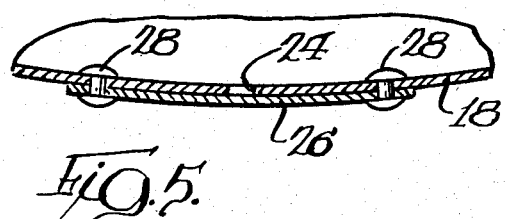
Fig. 4.
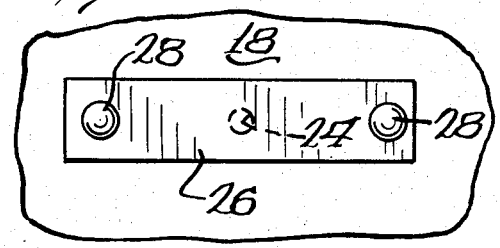
Fig. 5.
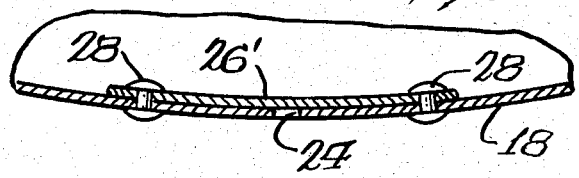
Fig. 6.
Fig. 7.

THERMALLY-RESPONSIVE MUFFLER DRAINHOLE VALVE MECHANISM

TECHNICAL FIELD

The present invention relates generally to an arrangement for facilitating flow of moisture from within a muffler assembly, and more particularly to a thermally-responsive valve mechanism configured for operative association with a drainhole in a muffler body.

BACKGROUND OF THE INVENTION

Internal combustion engines are typically equipped with muffler assemblies for effective noise attenuation during operation. Such a muffler assembly typically includes an outer shell or body with sound-attenuating baffling or the like positioned therein. Exhaust inlet and outlet means are typically provided for routing exhaust gases from the engine in and about the internal baffling. The engines of material handling equipment, automobiles, trucks, as well as other engine-driven devices usually all include one or more muffler assemblies for quiet operation.

One problem which acts to shorten the useful service life of a muffler assembly is the collection or formation of water and like moisture within the muffler body. Moisture collection typically results from condensation of residual exhaust gases within the assembly, or may result from moisture which otherwise enters the muffler body. Moisture within the muffler body frequently results in undesirable corrosion of the metallic material from which the muffler body is formed, and can also flow backwards from the muffler assembly when the engine is not operating and cause corrosion in the exhaust manifold of the engine.

While the provision of a water drainhole at a relatively low portion of a muffler assembly can provide a flow path for draining moisture from the interior thereof, such an expedient is less than satisfactory. Not only does the provision of such a drainhole in a muffler reduce its sound-attenuating capabilities, but further undesirably results in hot exhaust gases and particulate matter carried therein (i.e., soot) being directed against components of a particular device positioned near the drainhole. Such problems can be particularly pronounced in the case of internal combustion diesel engine which can be relatively noisy in operation, and which typically produce exhaust gases having large amounts of particulate matter.

Accordingly, it is very desirable to provide a valve mechanism for a muffler assembly drainhole which permits the flow of moisture and the like from within the muffler assembly when its associated engine is not operating, and which acts to close and seal the drainhole during periods of operation.

SUMMARY OF THE INVENTION

The present invention contemplates a muffler assembly for an internal combustion engine which includes a thermally-responsive valve mechanism. The valve mechanism is positioned in operative associated with a water drainhole defined by the body of the muffler, with the mechanism configured to close and open the drainhole attendant to thermal expansion and contraction of the muffler body. In this manner, moisture is permitted to freely flow from within the muffler when its associated engine is not operating and the muffler has cooled, with the valve mechanism sealing and closing the drainhole during periods of engine operation after the muffler assembly has been heated by the hot exhaust gases.

For purposes of illustration, the present invention is disclosed in association with a material handling implement, but it is to be understood that an arrangement embodying the principles of the present invention is suited for use on almost any type of muffler assembly such as for automobiles, trucks, portable compressors and generators, and other devices having internal combustion engines. A muffler assembly embodying the present invention includes an outer muffler body or shell which defines at least one moisture drainhole preferably positioned at a relatively low portion of the assembly where water within the assembly would otherwise collect.

The valve mechanism of the present invention is desirably straightforward in configuration for economy of manufacture and installation, and reliable operation. The valve mechanism comprises a valve member which is affixed to the muffler body with suitable mechanical fastening means in operative, overlapping association with the drainhole defined by the muffler body. Significantly, the valve member comprises metallic material having a coefficient of linear thermal expansion which differs from the coefficient of linear thermal expansion of the material of the portion of the muffler body which defines the drainhole. By this arrangement, the valve member acts to close and open the drainhole attendant the normal thermal expansion and contraction of the metallic muffler body.

In the illustrated embodiments of the present invention, the muffler body of the assembly is shown with a typically externally convex configuration. In one embodiment of the invention, the drainhole-sealing valve member is affixed to the exterior of the muffler body, with the material of the valve member having a coefficient of thermal expansion which is less than the coefficient of thermal expansion of the muffler body. In an alternative embodiment, the valve member is illustrated as affixed to the inerior of the muffler body, with the material of the valve member selected to have a coefficient of thermal expansion which is greater than the coefficient of thermal expansion of the muffler body material.

Other advantages and features of the present invention will become readily apparent from the following detailed description, the accompanying drawings, and the appended claims.

BRIEF DESCRIPTION OF THE DRAWINGS

FIG. 1 is a perspective view of a material handling implement having a muffler assembly including a thermally-responsive valve mechanism embodying the principles of the present invention;

FIG. 2 is a side elevational view of the muffler assembly illustrated in FIG. 1;

FIG. 3 is an enlarged cross-sectional view taken generally along lines 3—3 of FIG. 2 illustrating the present valve mechanism in an open condition;

FIG. 4 is a view similar to FIG. 3 illustrating the present valve mechanism in a closed condition;

FIG. 5 is a view taken generally along lines 5—5 of the FIG. 3 further illustrating the valve mechanism of the present invention;

FIG. 6 is a view similar to FIG. 3 illustrating an alternative embodiment of the present valve mechanism in an open condition; and FIG. 7 is a view similar to FIG. 6 illustrating the alternate embodiment of the present valve mechanism in a closed condition.

DETAILED DESCRIPTION

While the present invention is susceptible of embodiment in various forms, there is shown in the drawings and will hereinafter be described preferred and alterante embodiments of the invention, with the understanding that the present disclosure is to be considered as an exemplification of the invention, and is not intended to limit the invention to the specific embodiments illustrated.

Referring now to FIG. 1, therein is illustrated a material handling implement 10, shown as a bulldozer having crawler tracks 12 and a front dozer blade 14. Implement 10 is intended as illustrative of a device having an internal combustion engine to which a muffler assembly, designated 16, is fitted for sound-attenuation, but it is to be recognized that the present invention can be embodied as a muffler assembly for any type of internal combustion engine. Thus, use of the present invention can readily be effected for automobiles, trucks, portable engine-powered equipment, and the like.

Muffler assembly 16 has been illustrated in a typical generally elongated configuration, with a generally ovoid cross-sectional configuration. Of course, a muffler assembly embodying the present invention may be otherwise configured. The muffler 16 includes an outer muffler body or shell 18 typically comprising a suitable metallic material. The assembly includes an exhaust inlet 20 which delivers hot exhaust gases from the exhaust manifold of the associated internal combustion engine, and an exhaust outlet 22 for carrying the exhaust gases out of the muffler.

In order to permit draining of condensation and like moisture from within muffler body 18 by gravity, the body defines at least one drainhole 24 positioned at a relatively low portion of the muffler where water within the muffler would otherwise collect. The provision of drainhole 24 permits the condensation which typically forms within the muffler when its associated engine is not operating to readily flow by gravity from within the muffler. Thus, corrosion which could otherwise result within the muffler body or within the exhaust manifold of the associated engine is avoided.

In accordance with the present invention, muffler assembly 16 includes a valve mechanism operatively associated with the drainhole 24 which acts to close and open the drainhole attendant to thermal expansion and contraction of the muffler body 18, respectively. The valve mechanism is of desirably straightforward construction, comprises a valve member 26 affixed to muffler body 18 in overlapping relation relative to the drainhole 24. In the presently preferred embodiment of the invention illustrated in FIGS. 2–5, valve member 26 is of generally elongated construction, and is affixed to the exterior of muffler body 18. Rivets 28 or like fastening means, such as spot-welding, affix the respective ends of valve member 26 to the muffler body 18. During fabrication, valve member 26 is affixed to muffler body 18 while they are at room temperature, with the valve member spaced from drainhole 24 as shown in FIG. 3.

In order to effect the desired opening and closing of drainhole 24 attendant to thermal contraction and expansion of muffler body 18, valve member 26 comprises metallic material having a coefficient of linear thermal expansion which is substantially less than the coefficient of linear thermal expansion of the material of the portion of muffler body 18 which defines drainhole 24. Material selection is preferably made such that the coefficients of expansion of the muffler body 18 and the valve member 26 vary by a factor on the order of two. By way of example, valve member 26 may comprise a titanium strip when muffler body comprises a ferrous material such as steel. It will be recognized that other materials can be suitably employed for fabrication of valve member 26, with the material not only selected in accordance with its thermal expansion characteristics. but also preferably selected for corrosion-resistance so that water draining through drainhole 24 does not excessively corrode the valve member.

FIGS. 3 and 4 respectively show valve member 26 in its opened and closed conditions relative to the drainhole 24. FIG. 3 illustrates the relative position of the valve member and the drainhole 24 when muffler body 18 is relatively cool, such as when its associated engine is not operating. In this condition, the valve member 26 is relatively spaced from the drainhole 24, thus permitting the flow of water from within the muffler body 18. In contrast, FIG. 4 illustrates the relative positioning of valve member 26 and drainhole 24 after the muffler has become hot from exhaust gases, and has relatively expanded. Because of the relatively lower coefficient of thermal expansion of the valve member 26, expansion of the muffler body 18 results in the valve member 26 closing and sealing drainhole 24, thus preventing hot exhaust gases and soot from flowing from the drainhole, and thus avoiding reduction of the muffler's sound-attenuation capabilities.

FIGS. 6 and 7 illustrates an alternate embodiment of the present valve mechanism wherein a valve member 26' is affixed to the muffler body 18 on the interior thereof in overlapping relation relative to drainhole 24. Rivets 28 or like fastening means can be readily employed for affixing the respective ends of the generally elongated valve member 26' to the body 18. In this alternative embodiment, the illustrated relative orientation of the valve member 26' and the drainhole 24 requires that the metallic material from which valve member 26' is formed be selected to have a substantially greater coefficient of linear thermal expansion than that of the muffler body 18. Additionally, it will be noted that the valve member 26' is provided with an outwardly arcuate or "bowed" configuration which generally corresponds to the acruate cross-sectional configuration of the externally convexed muffler body 18. Thus, as the temperature of muffler body 18 increases during flow of hot exhaust gases therethrough, the relatively greater coefficient of thermal expansion of the valve member 26' results in the valve member being relatively re-positioned from an open condition spaced from drainhole 24 (FIG. 6) to its closed condition wherein drainhole 24 is sealed (FIG. 7).

As will be appreciated, the materials selected for formation of the thermally-responsive valve member, its dimensions, and its relative positioning with respect to the drainhole 24 of the muffler body 18 can be widely varied in keeping with the principles disclosed herein. The desirably straightforward configuration of the present valve mechanism readily permits use on all types of muffler assemblies, and further facilitates its convenient retrofit to existing sound-attenuating devices.

From the foregoing, it will be observed that numerous modifications and variations can be effected by those skilled in the art without departing from the true spirit and scope of the novel concept of the present invention. It will be understood that no limitation with respect to the specific embodiments disclosed herein is intended or should be inferred. It is, of course, intended to cover by the appended claims all such modifications as fall within the scope of the claims.

What is claimed is:

1. A muffler assembly having a thermally-responsive drainhole valve mechanism comprising
   a muffler body of metallic material which defines a drainhole through which water within said body can drain, and
   valve means operatively associated with said drainhole whereby said valve means closes and opens said drainhole attendant to thermal expansion and contraction of said muffler body,
   said valve means comprising a valve member having a coefficient of linear thermal expansion which differs from the coefficient of linear thermal expansion of the material of the portion of said muffler body which defines said drainhole,
   said member having a generally elongated configuration with opposite end portion thereof affixed to said muffler body with mechanical fastening means.

2. A muffler assembly and valve mechanism in accordance with claim 1 in which the muffler body comprises a ferrous material and the valve member comprises a titanium strip.

3. A muffler assembly and valve mechanism in accordance with claim 1, wherein
   the portion of said muffler body which defines said drainhole is of an externally convex configuration, said valve member being affixed to the exterior of said muffler body and comprising material having a coefficient of linear thermal expansion which is less than the coefficient of linear thermal expansion of the material of the portion of said muffler body which defines said drainhole.

4. A muffler assembly and valve mechanism in accordance with claim 1, wherein
   the portion of said muffler body which defines said drainhole is of an externally convex configuration, said valve member being affixed to the interior of said muffler body and comprising material having a coefficient of linear thermal expansion which is greater than the coefficient of linear thermal expansion of the material of the portion of said muffler body which defines said drainhole.

* * * * *